US012762857B2

(12) United States Patent
Zhang et al.

(10) Patent No.: US 12,762,857 B2
(45) Date of Patent: Oct. 13, 2026

(54) VIRTUAL REALITY HEADSET WITH PHYSICAL OBJECT REPRESENTATION

(71) Applicant: Hewlett-Packard Development Company, L.P., Spring, TX (US)

(72) Inventors: Ron Y. Zhang, Fort Collins, CO (US); Mario E. Campos, Spring, TX (US); John Curren Ludwig, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 481 days.

(21) Appl. No.: 18/250,966

(22) PCT Filed: Oct. 28, 2020

(86) PCT No.: PCT/US2020/057797
§ 371 (c)(1),
(2) Date: Apr. 27, 2023

(87) PCT Pub. No.: WO2022/093219
PCT Pub. Date: May 5, 2022

(65) Prior Publication Data

US 2023/0410502 A1 Dec. 21, 2023

(51) Int. Cl.

| | |
|---|---|
| ***G06V 20/20*** | (2022.01) |
| ***G06T 7/70*** | (2017.01) |
| ***G06T 19/00*** | (2011.01) |

(52) U.S. Cl.
CPC ................ *G06V 20/20* (2022.01); *G06T 7/70* (2017.01); *G06T 19/00* (2013.01); *G06T 2207/10016* (2013.01); *G06T 2207/10048* (2013.01)

(58) Field of Classification Search
CPC ........... G06V 20/20; G06T 7/70; G06T 19/00; G06T 2207/10016; G06T 2207/10048
See application file for complete search history.

(56) References Cited

U.S. PATENT DOCUMENTS 8,854,470 B2 * 10/2014 Park ...................... G06T 19/006 348/162
8,950,867 B2 * 2/2015 Macnamara ........... G03B 35/08 348/42
9,916,496 B2 3/2018 Vandonkelaar
(Continued)

FOREIGN PATENT DOCUMENTS

KR 10-1236644 B1 3/2013

*Primary Examiner* — Abderrahim Merouan
(74) *Attorney, Agent, or Firm* — Quarles & Brady LLP

(57) ABSTRACT

A virtual reality headset including a display to display a virtual environment, an imaging device to capture images of a physical environment surrounding the headset, and a controller to detect patterns of wavelength emitting devices in the captured images and to compare detected patterns to a library of known patterns, each known pattern corresponding to a physical object. When a detected corresponds to a known pattern, the controller to determine a position of the detected pattern in the physical environment relative to the headset, and to display in the virtual environment a virtual representation of the physical object corresponding to the known pattern at a position corresponding to the determined position of the detected pattern in the physical environment relative to the headset.

16 Claims, 6 Drawing Sheets

(56) References Cited

U.S. PATENT DOCUMENTS

| | | | | |
|---|---|---|---|---|
| 10,057,511 | B2 * | 8/2018 | Akselrod | H04N 23/56 |
| 10,083,544 | B2 | 9/2018 | Chen et al. | |
| 10,297,088 | B2 | 5/2019 | Rhodes et al. | |
| 10,319,100 | B2 | 6/2019 | Dai et al. | |
| 10,437,347 | B2 | 10/2019 | Holz et al. | |
| 10,492,981 | B1 * | 12/2019 | Kumar | A61H 19/44 |
| 10,838,489 | B2 * | 11/2020 | Price | G02B 27/4227 |
| 11,030,443 | B2 * | 6/2021 | Oami | G06V 10/24 |
| 11,163,416 | B2 * | 11/2021 | Powderly | G06F 3/0308 |
| 2018/0314406 | A1 | 11/2018 | Powderly et al. | |

* cited by examiner

VIRTUAL REALITY HEADSET WITH PHYSICAL OBJECT REPRESENTATION

BACKGROUND

Virtual reality (VR) is a computer-simulated environment which may be a 3D simulation of the real world (e.g., aircraft simulators) or a simulation of a 3D imaginary world (e.g., VR games). While simulated environments can be created via projection onto multiple screens in specially-designed rooms, the effect is often created through a VR headset which generates an immersive 3D environment via a display screen positioned in front of a user's eyes when wearing the headset.

DETAILED DESCRIPTION

Figure 1:
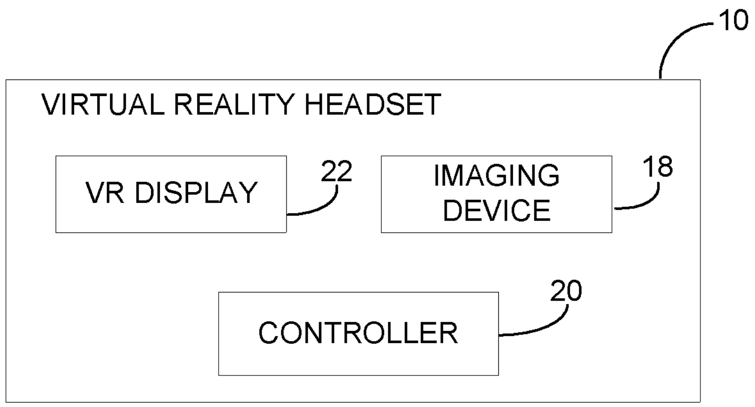
FIG. 1 is a block and schematic diagram generally illustrating a virtual reality headset, according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Virtual reality (VR) is a computer-simulated environment which may be a 3D simulation of the real world (e.g., simulations for pilot or combat training) or a simulation of a 3D imaginary world (e.g., VR games). While simulated environments can be created via projection onto multiple screens in specially-designed rooms, the effect is often created through a VR headset which generates an immersive 3D environment via a display screen positioned in front of a user's eyes when wearing the headset. A user can interact with the virtual environment with various devices such as gloves fitted with sensors and handheld devices such as a controller, a gyro-mouse, a joy pad, a smartphone, or other such handheld electronic devices.

Once immersed in the virtual environment, it can be beneficial for a user to interact with the physical environment in which the user is located (e.g., to avoid running into physical object, such as furniture, or to enter data for interaction with the virtual environment, such as via a keyboard). Such interaction can be accomplished simply by the user removing or lifting the VR headset to view the physical environment. While such approach is effective, the process of entering and exiting the VR environment interrupts the gaming experience, and takes time for the user to transition between environments. Some systems enable a user to interact with the real world environment by turning on one or more external cameras which transmit an overlay an image of the real world onto the virtual world on the viewing screen. However, such overlaid images can be visually distracting and cluttered by noise in the image. Another approach to enable real world interaction includes placing QR code stickers on devices. The QR code stickers are illuminated with an infrared source and detected with an IR camera located on the headset which identifies and displays the device in the virtual environment. Such approach can be costly and works only if the QR code stickers are in exposed locations viewable by the IR camera.

In accordance with the present disclosure, a technique for locating devices in the physical environment and projecting a virtual representation of the located device within the virtual environment is disclosed which employs sets of wavelength emitting devices disposed on devices located in the physical environment. In examples, the wavelength light emitting devices may emit light in the visible spectrum and non-visible spectrum, such as IR light, for example. In examples, the light emitting devices may be light emitting diodes (LEDs). According to examples, each set of wavelength emitting devices provides a unique pattern which is employed to identify the corresponding physical device.

In examples, a detecting device on the VR headset, such as an imaging device (e.g., a visible light camera and/or an IR camera) takes images of the physical environment surrounding the VR headset. From the captured images, a controller (which may be disposed on the VR headset) detects the patterns of wavelength emitting devices and the location of the detected patterns within the physical environment relative to the VR headset. In examples, the detected patterns are compared to a library of known patterns to determine whether there is a match. If there is a match, a virtual representation (sometimes referred to as a virtual user interface) corresponding to the detected device is overlaid on the virtual environment displayed to the user within the VR headset at the location of the detected device in the physical environment relative to the VR headset.

The virtual user interface enables a user to be notified of the location and to interact with devices/objects in the physical environment without the need to remove the VR headset or without the need to overlay images/video of physical environment on the virtual environment. For example, in some instances, a user may need to interact with the virtual environment by entering data through a keyboard. Rather than entering data in a cumbersome fashion via a virtual grid-type keyboard where each letter is individually entered by scrolling a pointer across the grid, the virtual user interface enables a user to locate a keyboard in the physical environment to easily enter data without the need to remove the VR headset, thereby maintaining the user's experience within the virtual environment.

FIG. 1 is a block and schematic diagram generally illustrating a VR headset 10, according to one example of the present disclosure. VR headset 10 includes an imaging device 18 to capture images of a physical environment surrounding VR headset 10, and a display 22 to display a virtual environment. In one example, VR headset 10 includes a controller 20 to detect patterns of wavelength emitting devices in the captured images, and to compare detected patterns to a library of known patterns, where each known pattern corresponds to a physical object. In one example, when a detected pattern of wavelength emitting devices corresponds to a known pattern, controller 20 determines a position of the detected pattern in the physical environment relative to the headset, and displays in the virtual environment on display 22 a virtual representation of the physical object corresponding to the known pattern at a position corresponding to the determined position of the detected pattern in the physical environment relative to VR headset 10.

Figure 2A:
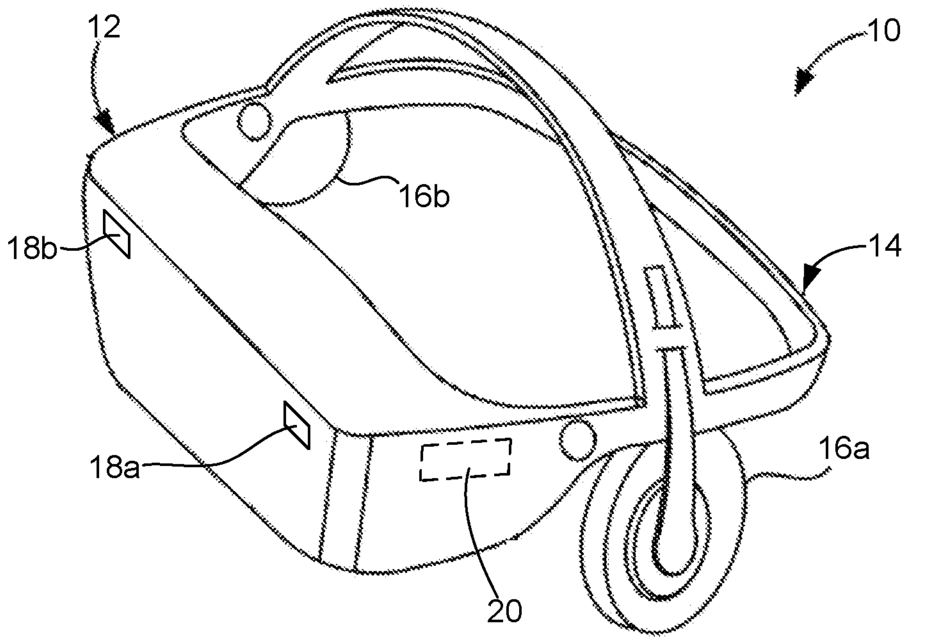
FIG. 2A is a perspective view of a virtual reality headset, according to one example.
Figure 2B:
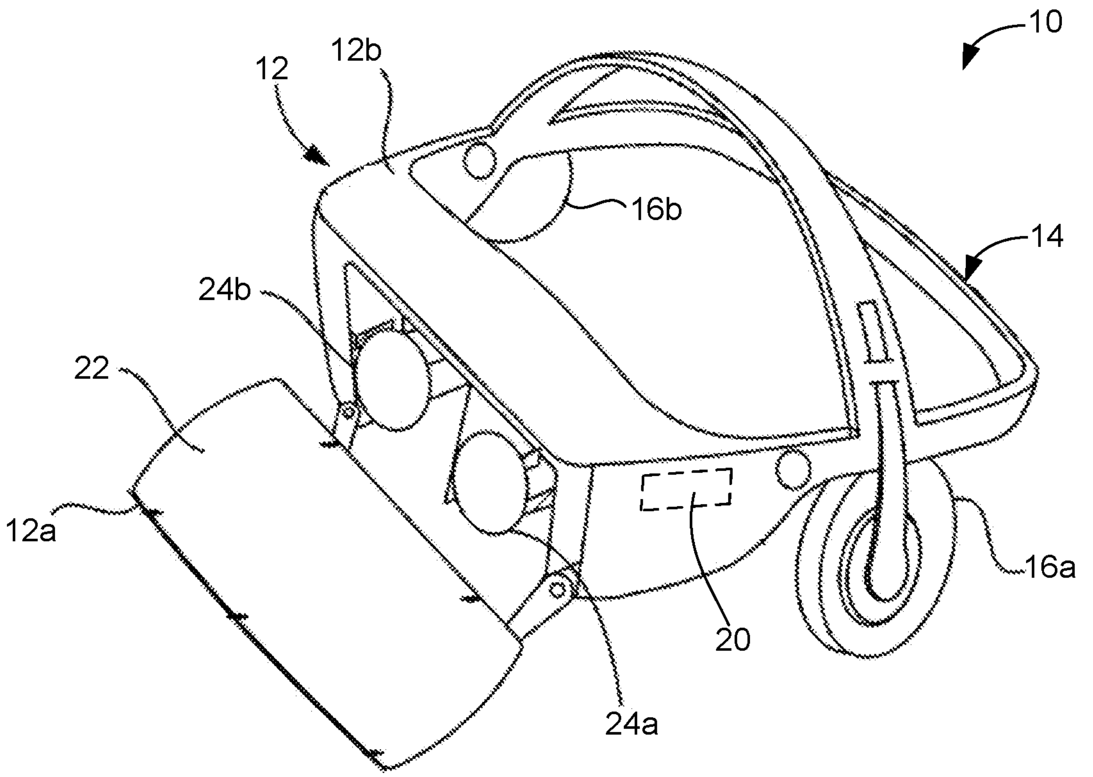
FIG. 2B is a perspective view of a virtual reality headset, according to one example.

FIGS. 2A and 2B are perspective views of a VR headset 10 that, when worn by a user, displays an immersive 3D virtual environment on a display positioned in front of a user's eyes, where, in accordance with examples of the present disclosure, headset 10 displays, in the virtual environment, virtual representations of physical objects located in the surrounding physical environment (e.g., keyboards, monitors, workstation towers, furniture, etc.) to enable the user to interact with such physical objects without disrupting the virtual experience (such as occurs when needing to remove the headset or overlaying images/video of the physical environment over the virtual environment).

Headset 10 includes a housing 12 for holding optical and computing components, with a head frame or head strap 14 coupled to housing 12 to enable housing 12 to be worn on the head of a user. In examples, an audio device 16, such as headphone speakers 16*a* and 16*a*, may be coupled to head strap 14. In examples, headset 10 includes at least one sensing device 18 disposed on housing 12 for detecting physical objects in a surrounding physical (or ambient) environment, and a controller 20 (e.g., including a processor and memory) for facilitating operations of headset 10.

In examples, sensing device 18 is an imaging device for capturing still and/or moving images of the physical environment about headset 10 when worn by a user. In some examples, as illustrates, sensing device includes a pair of sensing devices 18*a* and 18*b*, such as a pair of imaging devices. In some implementations, imaging devices 18 may include visible light cameras. In other examples, imaging devices 18 may be infrared spectrum cameras including an infrared illuminator. In other implementations, imaging devices 18 may be visible spectrum cameras including a depth sensor than can determine a distance from the camera 18 (or headset) to a detected wavelength emitting device. Any number of suitable imaging and location sensing devices may be employed.

In FIG. 2B, a faceplate 12*a* of housing 12 is illustrated as being rotated to an open position from housing base 12*b* to expose a visual display 22 for displaying a virtual environment to a user when wearing headset 10. In examples, a pair of lenses 24*a* and 24*b*. Lenses 24*a* and 24*b* are disposed so as to be positioned between a user's eyes and visual display 22 when faceplate 12*a* is in a closed position, where lenses 24*a* and 24*b* may be aligned with optical axes of a user's eyes to provide a wide field of view of the virtual environment with a short focal length. In examples, visual display 22 may also display images of the physical environment provided via imaging devices 18*a* and 18*b*.

In accordance with examples of the present disclosure, during operation of headset 10, images of the physical environment captured by imaging devices 18*a* and 18*b* are provided to controller 20. In examples, controller 20 compares detected patterns of wavelength emitting devices in the captured images to a library of known patterns, where each known pattern corresponds to a physical object (e.g., a keyboard, a mouse, a piece of furniture). In some examples, the library of known patterns may be stored in a memory as part of controller 20 on headset 10. In other implementations, the library of known patterns may be stored remotely from headset 10. In other examples, a portion of the library of known patterns may be stored on headset 10 (e.g., commonly occurring patterns), and another portion of the library of known patterns may be disposed in memory remote from headset 10 (e.g., on a local computing device with which headset 10 is in communication, such as a gaming station, or on an edge server).

In examples, patterns of wavelength emitting devices may be a particular physical configuration of wavelength emitting devices (e.g., a group of wavelength emitting devices configured to form a rectangle having a certain aspect ratio), may be of a particular combination of different wavelengths (e.g., a particular combination of colors, or any combination thereof. In examples, such wavelength emitting devices may emit wavelengths in the visible spectrum, infrared spectrum, or a combination thereof. Any suitable device emitting a suitable wavelength may be employed.

According to one example, when a detected pattern of wavelength emitting devices corresponds to a known pattern, controller 20 determines a position of the detected pattern in the physical environment relative to headset 10, and displays in the virtual environment on display 22 a virtual representation of the physical object corresponding to the known pattern at a position corresponding to the determined position of the detected pattern in the physical environment relative to headset 10. In examples, the virtual representation of the physical object serves as a user interface to enable a user to interact with, or avoid interaction with, the physical object. In some examples, such user interface may be a simple wireframe outline of the physical object. In other examples, such wireframe outline may include text identifying the physical object, and/or may include a number of key features of the physical device (e.g., one or more significant keys of a keyboard). Any number of suitable user interface configurations may be employed.

VR headset 10, in accordance with the present disclosure, notifies a user of the location of devices/objects in the physical environment, and enables the user to interact with such devices/objects without having to interrupt a user's VR experience by eliminating the need to remove the VR headset or to over overlay disruptive images/video of the physical environment on the virtual environment.

For example, as will be described in greater detail below, VR headset 10 enables a user to more efficiently enter data as part of a VR experience through a keyboard (as opposed to a cumbersome virtual grid-type keyboard) and to avoid safely operate within a physical environment (e.g., avoid obstacles such as furniture) while remaining within the VR experience.

Figure 3:
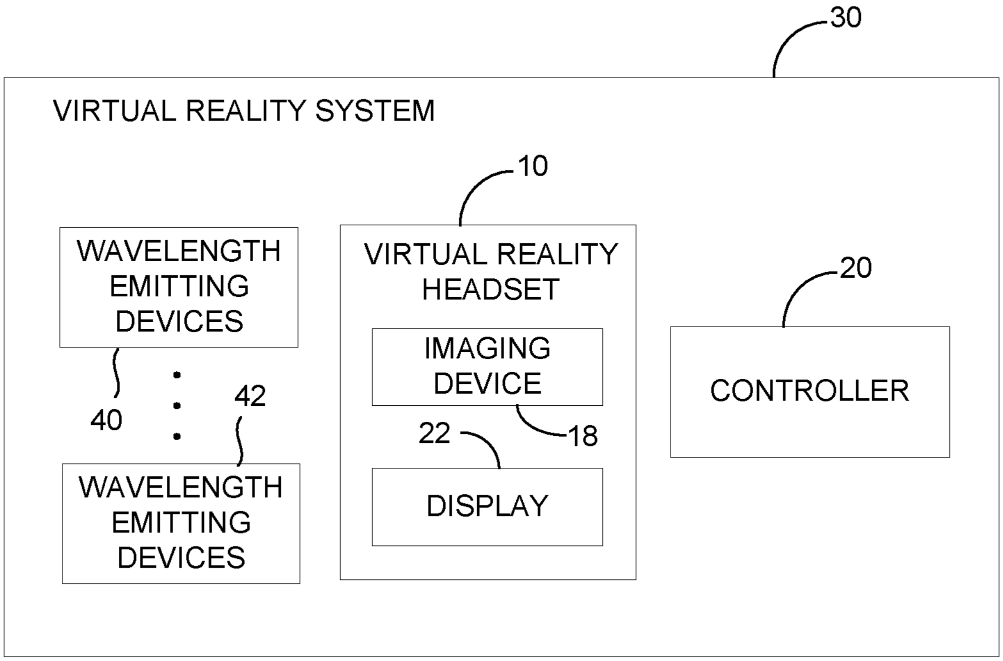
FIG. 3 is a block and schematic diagram generally illustrating a virtual reality system, according to one example.

FIG. 3 is a block and schematic diagram generally illustrating a VR system 30 including a VR headset 10, in accordance with examples of the present disclosure. In one example, in addition to VR headset 10, VR system 30 includes controller 20 a number of sets of wavelength emitting devices, such as sets 40 and 42 of wavelength emitting devices, where each set is disposed on a different object located in a surrounding physical environment in which VR system 30 is disposed, and where each set has a unique pattern corresponding to the object on which it is disposed. Virtual reality headset 10 operates in the physical environment and displays a virtual environment on display 22. In examples, VR headset 10 includes at least one imaging device 18 to capture images of the surround environment.

In examples, controller 20 detects patterns of wavelength emitting devices in the captured images and a location of the detected light patterns in the ambient environment relative to the virtual reality headset. Controller 20 compares detected patterns to a library of known patterns, where each known pattern corresponds to a physical object. In examples, when a detected pattern matches a known pattern, controller 20 overlays a virtual representation of the corresponding physical object on the virtual environment as displayed by display 18 at a location of the physical object relative to VR headset 10.

Figure 4:
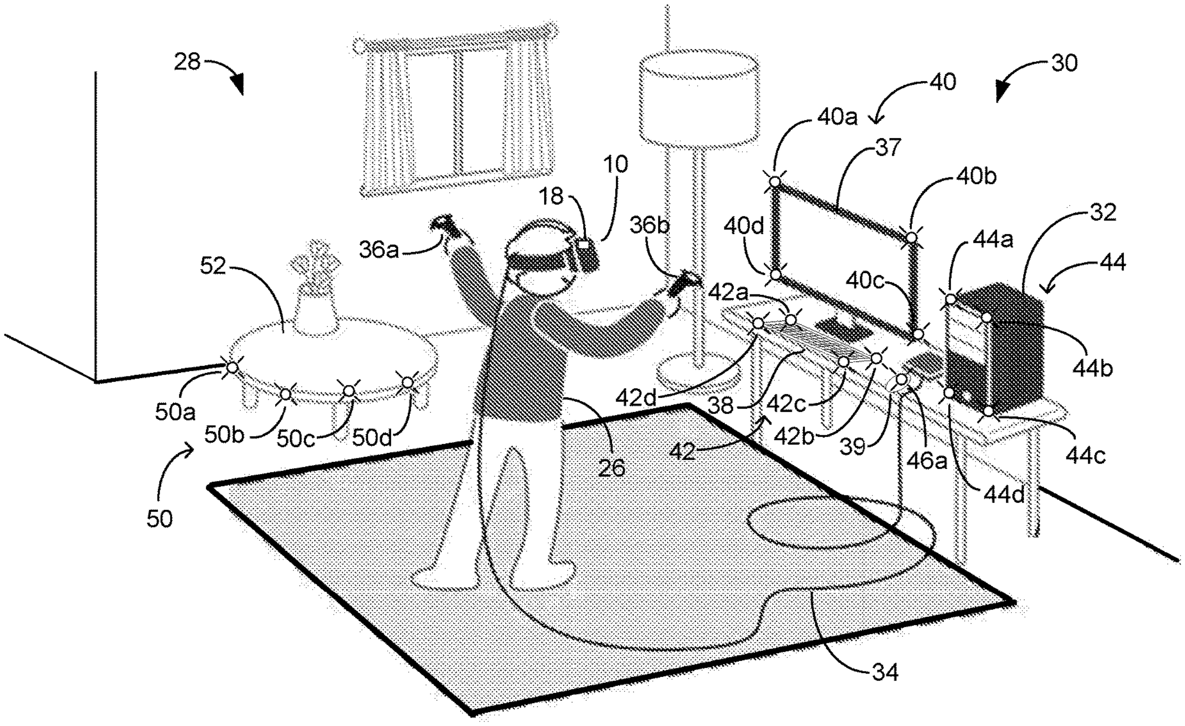
FIG. 4 generally illustrates and describes a virtual reality system, according to one example.

FIG. 4 is a perspective view generally illustrating a VR system 30 including a VR headset 10 and techniques for detecting objects in a physical environment and displaying virtual representations of such detected objects in the virtual environment, in accordance with the present disclosure. As illustrated, a user 26 in a physical environment 28 is immersed in a virtual environment via VR headset 10 of VR system 30.

In one example, in addition to VR headset 10, VR system 30 includes a computing device 32 (e.g., a PC, workstation, or other suitable computing device) to which headset 10 is in communication, such as via a tether 34, and handheld controllers 36*a*, 36*b* (e.g., sensor-fitted gloves, gyro-mouse, joy pad, or other suitable electronic devices). In one example, computing device 32 includes a number of accessories, such as a monitor 37, a keyboard 38, and a mouse 39, for instance.

In accordance with the present disclosure, VR system 30 includes a number of sets wavelength emitting devices which are disposed on various objects within physical environment 28. According to the illustrated example, a set 40 of wavelength emitting devices 40*a*-40*d* is disposed on monitor 37, a set 42 of wavelength emitting devices 42*a*-42*d* is disposed on keyboard 38, a set 44 of wavelength emitting devices 44*a*-44*d* is disposed on computing device 32, and a set of wavelength emitting devices 46*a* disposed on mouse 39.

In examples, the sets of wavelength emitting devices may emit visible light having any number of colors. In one example, such light emitting devices may be light emitting diodes (LEDs). In other examples, the sets of wavelength emitting devices may emit wavelengths from the non-visible spectrum, such as infrared (IR) light, for example (e.g., IR LEDs). In other examples, the sets of wavelength emitting devices may emit electromagnetic radiation of any suitable wavelength. In some examples, the sets of wavelength emitting may emit a combination of wavelengths, such as visible and IR wavelengths, for example.

According to examples, each set of wavelength emitting devices is implemented to form a unique pattern which corresponds to the particular object on which the set of wavelength emitting devices are disposed. For example, in FIG. 4, the set 42 of wavelength emitting devices 42*a*-42*d* disposed on keyboard 38 may have a rectangular pattern with a certain aspect ratio (e.g., length-to-width) which is unique to and identifies a particular keyboard 38 (e.g., a keyboard of a particular manufacturer and model). In examples, the unique pattern provided by the set 42 of wavelength emitting devices 42*a*-42*d* may be a particular color pattern that is unique to and identifies a particular keyboard 38. In another example, the unique pattern provided by the set 42 of wavelength emitting devices 42*a*-42*d* may be a particular "blink rate" of wavelength emitting devices 42*a*-42*d* that is unique to and identifies a particular keyboard 38. In some cases, combinations of the above patterns may be employed as a unique pattern provided by the set 42 of wavelength emitting devices 42*a*-42*d* to which is unique to keyboard 38 (e.g., a particular geometric pattern with particular colored lights at particular locations within the geometric pattern). It is noted that any number of suitable features (in addition to geometric patterns, wavelengths, colors, blink rates, etc.) may be employed to define unique patterns for identifying corresponding devices. Additionally, although illustrated as generally including four wavelength emitting devices, such as wavelength emitting devices 40*a*-40*d* of the set 40 of light emitting devices corresponding to monitor 40, in other examples, sets of wavelength emitting devices may include more or fewer than four wavelength emitting devices.

Currently, many electronic devices, such as computer towers, computer cases, keyboards, and mice, for example, are being manufactured with LED lighting. Such devices are sometimes referred to as RGB products. In some cases, the built-in lighting of such RGB products may serve functional purposes, such as monitor backlighting to improve image contrast, and backlighting of keyboard keys to illuminate the keys in low-light conditions, for example. In other cases, such lighting may be for aesthetic purposes only.

According to some examples, the built-in lighting of such RGB products provides a unique pattern by which the corresponding device may be identified. In some cases, the built-in lighting of such RGB products allows users to adjust the lighting (e.g., change colors) to create their own unique lighting pattern. In such cases, according to examples of the present disclosure, VR system 30, such as via computing device 32 or controller 20 of headset 10, may set the build-in lighting of such RGB products to a predetermined pattern when user 26 is engaged in a VR experience. When not operating in a VR "mode", the light pattern of such built-in lighting will return to a "normal" operating mode.

In operation, such as when running a VR application (e.g., a VR game) on computing device 32, user 26 is immersed in a virtual environment via internal display 22 of VR headset 10. User 26 is able to interact with the virtual environment, such as via handheld control devices handheld 36*a*, 36*b* (e.g., sensor-fitted gloves, gyro-mouse, joy pad, or other suitable electronic devices).

According to examples of the present disclosure, during such operation, external imaging devices 18 capture images of physical environment 28. In some examples, such images may be still images. In other examples, such images may be moving images. In some examples, such images are captured based on a refresh rate (e.g., 60 Hz, 120 Hz).

In one example, controller 20 of VR headset 10 compares detected patterns of wavelength emitting devices in the captured images, such as a pattern formed by wavelength emitting devices 42*a*-42*d* of the set of wavelength emitting devices 42 corresponding to keyboard 38, to a library of known patterns, where each known pattern corresponds to a physical object. In one example, as will be described in greater detail below, such pattern library may reside in memory disposed in VR headset 10, in a memory remote from VR headset 10, such as memory in computing device 32 or in an edge server (e.g., a cloud server), or in a combination of such memory locations.

In examples, when a detected pattern of wavelength emitting devices corresponds to a known pattern, the controller, such as controller 20 of VR headset 10, determines a position of the detected pattern in physical environment 20 relative to the VR headset 10, and displays in the virtual environment on display screen 22 a virtual representation of the physical object corresponding to the known pattern ((so-called "user interface") at a position corresponding to the determined position of the detected pattern in physical environment 28 relative to headset 10.

For example, if controller 20 determines a match between a detected pattern and a known pattern in the pattern library, such as a pattern formed by wavelength emitting devices 42*a*-42*d* of the set of wavelength emitting devices 42 corresponding to keyboard 38, controller 20 overlays a user interface representative of keyboard 38 on the virtual environment displayed on display 22 of headset 10, where such user interface is to-scale and at a position corresponding to the actual position of keyboard 38 relative to VR headset 10. In examples, the position and scale of the virtual user interface overlaid on the virtual environment is updated at the refresh rate of display 22 (e.g., 60 Hz, 120 Hz) as the physical position of headset 10 relative to keyboard 38 changes due to movement of user 26.

In other examples, in addition to employing built-in wavelength emitting devices of electronic devices to serve as unique patterns for identifying the corresponding electronic device, sets of light emitting devices (e.g., light emitting device kits) may be user-applied to objects within physical environment 28, where a pattern of such user-applied sets of light emitting devices is unique and employed by VR system 30 to identify the corresponding physical object. In addition to applying user-applied sets of wavelength emitting devices to physical objects which are part of VR system 30 when such devices do not include built-in lighting (e.g., computing device 32, monitor 37, and keyboard 38), user-applied sets of light emitting devices may be applied to any object within physical environment 28.

For example, as illustrated by FIG. 4, a set 50 of light emitting devices 50*a*-50*d* is indicated as being disposed on a table 52, where a unique pattern defined by light emitting devices 50*a*-50*d* corresponds to table 52. User-applied sets of light emitting devices allow user 26 to identify any objects within physical environment 28 such as furniture items (e.g., chairs, desks, lamps, etc.), televisions, cell phones, beverage holders, etc.—any item user 26 wishes to track while immersed in the virtual environment.

The representation of a physical object in the virtual environment via the virtual user interface provides notification to user 26 of the location of the corresponding physical device to enable user 26 to interact with, or avoid interaction with, the physical object without interrupting the virtual experience. For example, notification of the location of keyboard 38 and mouse 39 enables user 26 to interact with the virtual environment by using such devices to enter data when requested by a particular application, for instance, while notification of the location of furniture items, such as table 52, enables user 26 to avoid contact with such items when immersed in the virtual environment.

Any number of suitable user interface configurations may be employed. In some examples, such user interface may be a simple wireframe outline of the physical object. In other examples, such wireframe outline may include text identifying the physical object, and/or may include a number of key features of the physical device. For example, in the case of keyboard 38, in addition to a wire-frame outlined, the virtual user interface may include one or more significant keys, such as the <esc> key, the <delete> key, the <ctrl> key, for instance. In some examples, the virtual user interfaces may be of a particular color. For instance, user interfaces of physical objects having a similar function may be of a same color (e.g., virtual user interfaces for electronic components associated with VR system 30 may be green, furniture items may be red, beverage containers may be blue, etc.).

As described above, in examples, known patterns of light emitting devices along with the corresponding physical device and virtual user interface are stored in a pattern library. In some cases, such pattern library may be stored on headset 10 (e.g., as part of controller 20). In other cases, such pattern library may be stored locally, such as on computing device 32. In other cases, such pattern library may be stored remotely, such as on an edge server, for example. In examples, known light patterns for electronic devices having built-in wavelength emitting devices (e.g., visible spectrum LEDs), and virtual user interfaces corresponding to such devices, may be updated (e.g., as part of software updates for VR headset 10). In examples, when user-applied sets of wavelength emitting devices are employed, a learning mode of VR headset 10 may be initiated where imaging device 18 obtains the unique pattern of the user-applied set of lights and user 26 creates a user interface for the corresponding physical object, where the pattern and user interface are stored in the pattern library. In some examples, user 26 may apply kits including sets of wavelength emitting device kits for use with VR headset 10, where such kits have preconfigured patterns.

Figure 6:
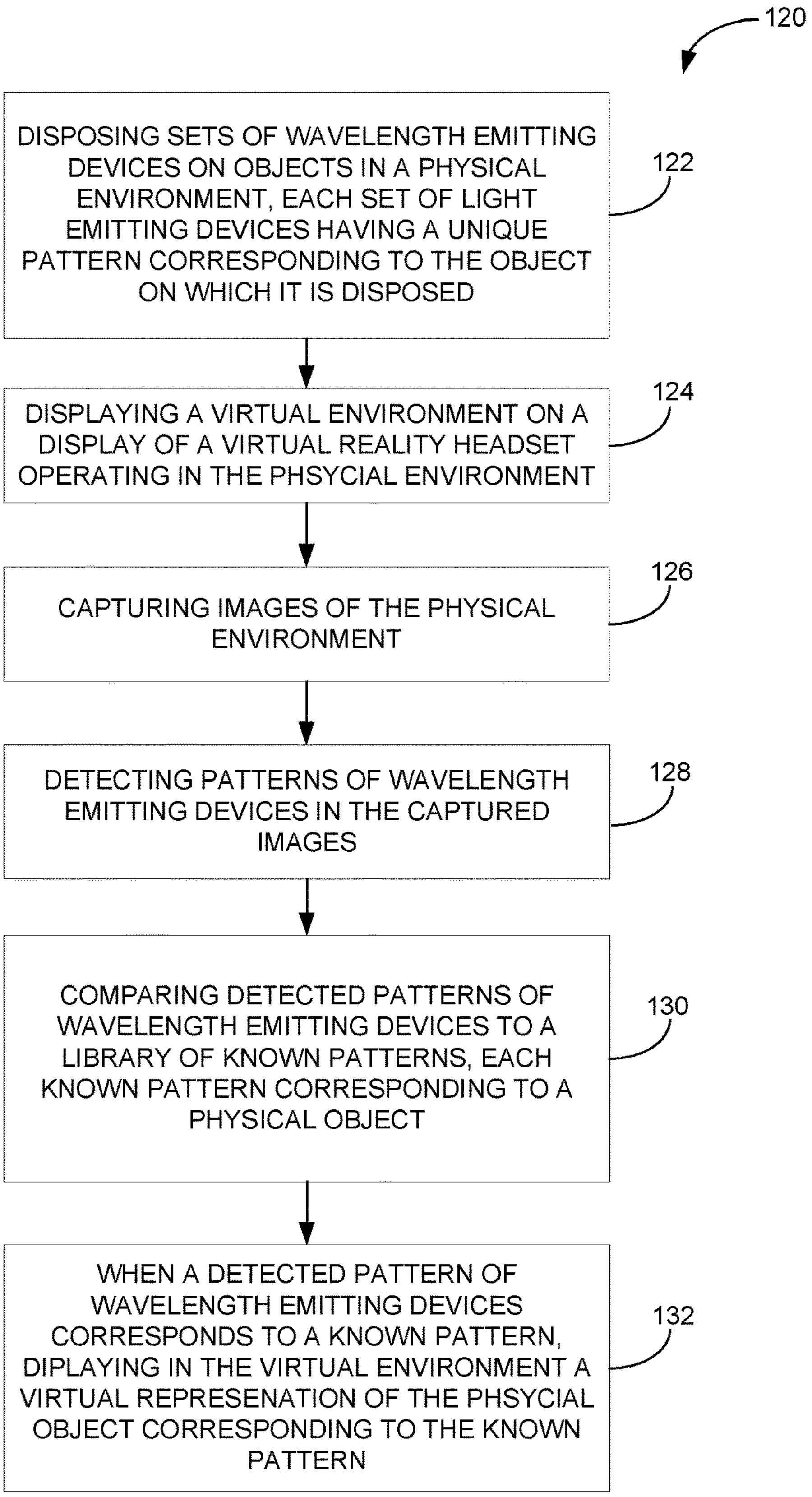
FIG. 6 is a flow diagram generally illustrating a method of operating a virtual reality system, according to one example.

FIG. 6 is a block and schematic diagram generally illustrating a VR headset 10, according to one example, such as illustrated by FIGS. 1A, 1B, and 2. In one example, controller 20 includes a processor 70 and a memory 72. In one example, memory 72 includes a pattern library 74 and a comparison module 76. In one case, pattern library 72 includes a number of known light emitting device patterns 78 and a number of user interfaces 78, where each pattern and each user interface correspond to a different physical object. In one example, controller 20 includes a communication module 82 for communicating with external devices, such as computing device 32 (see FIG. 2) or network devices (e.g., cloud-based servers).

In examples, as described above, imaging devices 18 provide captured images of a physical environment surrounding VR headset 10, where such images are provided to controller 20. In examples, comparison module 76 includes computer-executable instructions executable by processor 70 to identify and compare patterns of wavelength emitting devices in the captured images, such as a pattern provided by set 40 of wavelength emitting devices 40*a*-40*b* in FIG. 4 (e.g., visible spectrum LEDs), and compare identified patterns to known patterns 78. In one example, when a detected pattern corresponds to a known pattern 78, controller 20 determines a position of the detected pattern in physical environment 28 (see FIG. 4) relative to VR headset 10, and displays in the virtual environment a virtual representation (also referred to as a virtual user interface) of the physical object corresponding to the known pattern at a position corresponding to the determined position of the detected pattern in the physical environment relative to VR headset 10. In examples, a scale and position of the virtual user interface is updated as additional captured images are received by controller 20.

In one example, VR headset 10 is in communication with a computing device, such as computing device 32 (see FIG. 4), where VR headset 10 and computing device 32 are part of a VR system (such as VR system 30 in FIG. 4). In one example, computing device 32 includes a controller 90, where controller 90 includes a processor 92 and a memory 94 including a pattern library 95, a comparison module 96, and a pattern module 97, where pattern library 95 and comparison module 96 are similar to pattern library 74 and comparison module 76 of VR headset 10. In some examples, pattern library 95 and comparison module 96 may be employed in lieu of pattern library 74 and comparison module 76. In other examples, pattern library 95 and comparison muddle 96 may compliment pattern library 74 and comparison module 76 of VR headset 10. For example, in one case, pattern library 74 may contain frequently occurring pattern and user interfaces, or patterns and user interfaces corresponding to electronic devices having built-in wavelength emitting patterns, while pattern library 95 may include patterns and user interfaces unique to the particular VR system 30 (such as system 30 of FIG. 4, for example). In one example, processor 92 implements pattern module 97 to set built-in lighting of electronic devices (e.g., computing device 32, monitor 37, keyboard 38, and mouse 39 of FIG. 4) to predetermined patterns when operating in a VR operating mode (such as described above with respect to FIG. 4).

Figure 5:
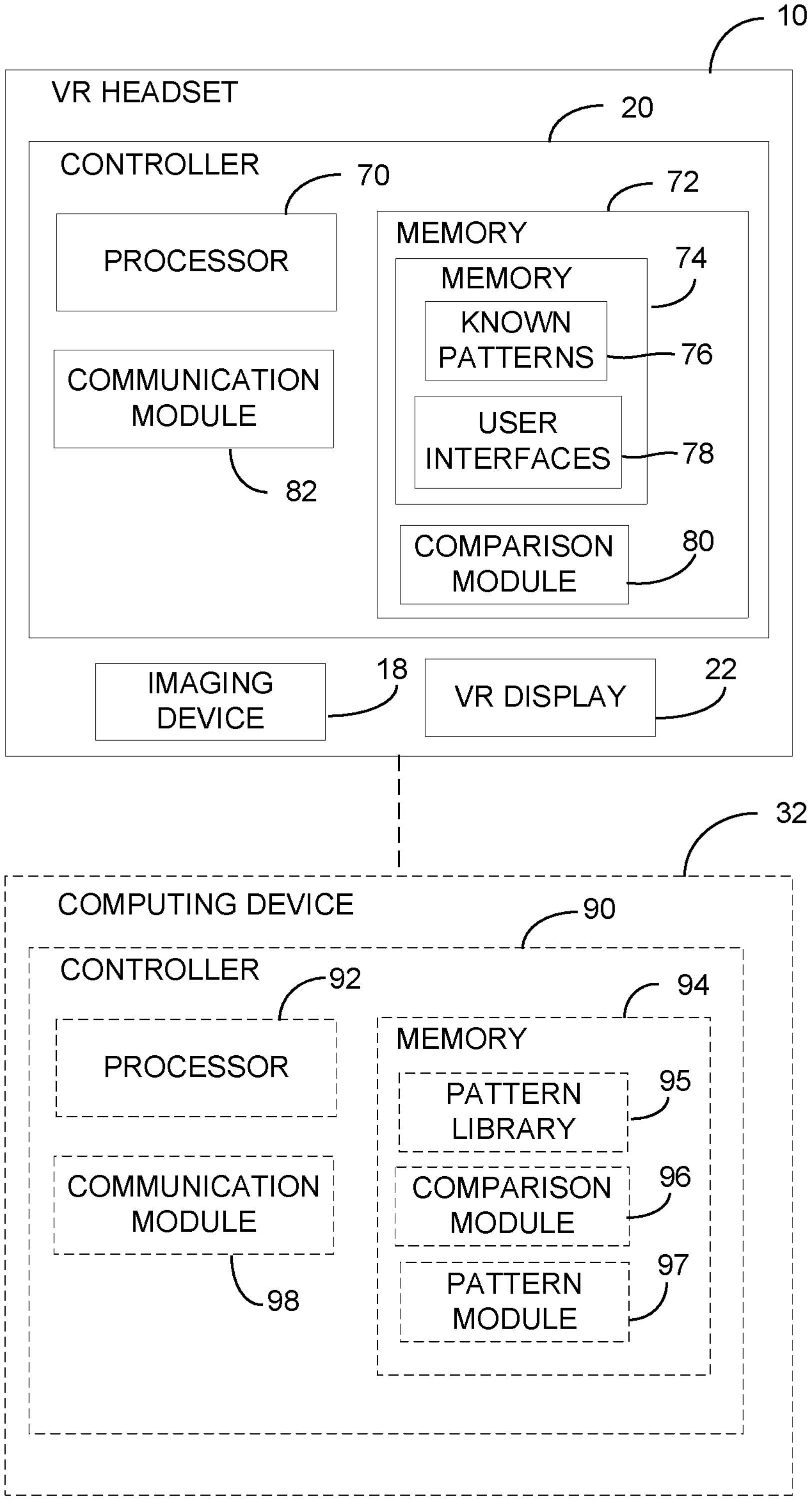
FIG. 5 is a block and schematic diagram generally illustrating a virtual reality headset, according to one example.

FIG. 5 is a flow diagram generally illustrating a flow diagram of a process 120 for operating a VR headset, such as VR headset 10, according to one example. Process 120 begins a 122, where sets of light emitting devices are disposed on objects in a physical environment, where each set of light emitting devices has a unique pattern corresponding to the object on which it is disposed, such as sets of light emitting devices 40, 42, 44, and 50 being respectively disposed on monitor 37, keyboard 38, computing device 32, and table 52 in physical environment 28 of FIG. 4.

At 124, process 120 includes displaying a virtual environment on a display of a VR headset, such as on display 22 of VR headset 10 of FIG. 2B. At 126, the method includes capturing images of the physical environment in which the VR headset is disposed, such as capturing images of environment 28 by external cameras 18 of VR headset 10, as illustrated by FIG. 4.

At 128, process 120 includes detecting patterns of wavelength emitting devices in the captured images and, at 130, comparing detected patterns to a library of known patterns, where each known pattern corresponds to a physical object, such as controller 20 employing comparison module 76 to compare captured images to known patterns 78 of pattern library 74 as described and illustrated with respect to FIG. 5.

At 132, if a detected pattern corresponds to a known pattern, process 120 includes determining a position of the detected pattern in the physical environment relative to the headset, and displaying in the virtual environment a virtual representation of the physical object corresponding to the known pattern at a position corresponding to the determined position of the detected pattern in the physical environment relative to the headset.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A virtual reality headset comprising:

a display screen to display a virtual environment;

an imaging device to capture, while the display screen displays the virtual environment, an image of a physical environment surrounding the headset; and a controller to:

detect, in the image captured by the imaging device, a unique pattern emitted from a wavelength emitting device, determine, in response to detecting a match between the unique pattern in the image and a known pattern corresponding to a physical object in the physical environment, a location of the wavelength emitting device in the physical environment, and trigger, in response to determining the location of the wavelength emitting device, the display screen to render a virtual representation of the physical object at a location in the virtual environment that corresponds to a location of the physical object in the physical environment.

2. The virtual reality headset of claim 1, wherein the imaging device comprises a visible light spectrum camera.

3. The virtual reality headset of claim 1, wherein the imaging device comprises an infrared camera.

4. The virtual reality headset of claim 1, wherein the image comprises a still image and/or moving images.

5. The virtual reality headset of claim 1, wherein the virtual representation comprises a wire-frame outline of the physical object.

6. The virtual reality headset of claim 1, wherein the known pattern is from a library of known patterns that resides in a memory on the headset.

7. The virtual reality headset of claim 1, wherein the controller is to overlay the virtual representation of the wavelength emitting device onto the virtual environment.

8. The virtual reality headset of claim 1, wherein the wavelength emitting device is to emit the unique pattern while disposed on the physical object.

9. A virtual reality system comprising:

a plurality of sets of wavelength emitting devices, different object located in a physical environment, and each set having a device from among the wavelength emitting devices to emit a unique pattern that corresponds to a physical object on which the device is disposed;

a virtual reality headset comprising:

a display screen to display a virtual environment, and an imaging device to capture, while the display screen displays the virtual environment, an image of a physical environment; and a controller to:

detect, in the image captured by the imaging device, the unique pattern, determine, in response to detecting a match between the unique pattern in the image and a known pattern corresponding to the physical object, a location of the device in the physical environment, and trigger, in response to determining the location of the device, the display screen to render a virtual representation of the physical object at a location in the virtual environment that corresponds to a location of the physical object in the physical environment.

10. The virtual reality system of claim 9, the unique pattern comprises at least one of a geographic pattern and a color pattern.

11. The virtual reality system of claim 9, the wavelength emitting devices of each set of wavelength emitting devices comprising at least one of visible light emitting diodes and infrared diodes.

12. The virtual reality system of claim 9, the imaging device comprises one of a visible light spectrum camera and an infrared camera.

13. The virtual reality system of claim 9, where the virtual representation comprises a wire-frame outline of the physical object.

14. The virtual reality system of claim 9, a set of light emitting devices being configurable to a number of customizable light patterns.

15. The virtual reality system of claim 9, where the controller is disposed on the virtual reality headset.

16. A method of operating a virtual reality system comprising:

disposing a wavelength emitting device on a physical object in a physical environment, the wavelength emitting device emitting a unique pattern corresponding to the physical object on which it the wavelength emitting device is disposed;

displaying, by a virtual reality headset, a virtual environment on a display screen of the virtual reality headset;

capturing, by an imaging device while the display screen displays the virtual environment, an image of the physical environment;

detecting, by a controller, the unique pattern in the image captured by the imaging device;

determining, by the controller in response to detecting a match between the unique pattern in the image and a known pattern corresponding to the physical object, a location of the wavelength emitting device in the physical environment; and trigger, in response to determining the location of the device, the display screen to render a virtual representation of the physical object at a location in the virtual environment that corresponds to a location of the physical object in the physical environment.

* * * * *